United States Patent [19]

Even

[11] Patent Number: 5,187,433
[45] Date of Patent: Feb. 16, 1993

[54] DEVICES FOR MEASURING BRAKING TORQUES GENERATED BY ELECTROMAGNETIC RETARDERS, AND DEVICES FOR ADJUSTING SUCH TORQUES

[75] Inventor: Denis Even, Cergy, France
[73] Assignee: Labavia S.G.E., France
[21] Appl. No.: 766,522
[22] Filed: Sep. 27, 1991

[30] Foreign Application Priority Data

Oct. 5, 1990 [FR] France .................. 90 12320

[51] Int. Cl.$^5$ .............................. H02P 5/40
[52] U.S. Cl. .................. 324/158 MG; 364/426.01;
364/426.02; 73/862.333; 73/862.193
[58] Field of Search ........... 324/158 MG, 158 R, 161;
73/168, 862.19, 659, 862.09, 862.12, 862.33,
862.36; 318/490, 472; 364/426.01, 426.02,
426.03; 303/92, 100; 310/105, 93; 188/161, 158

[56] References Cited

U.S. PATENT DOCUMENTS

| | | | |
|---|---|---|---|
| 3,960,410 | 6/1976 | Leitz et al. | 324/161 |
| 4,545,261 | 10/1985 | Gebben | 73/862.33 |
| 4,583,411 | 4/1986 | Hales | 73/862.09 |
| 4,583,611 | 4/1986 | Frank et al. | 324/161 |
| 4,616,179 | 10/1986 | Braun | 324/158 MG |
| 4,672,288 | 6/1987 | Abbondanti | 324/158 MG |
| 4,790,606 | 12/1988 | Reinecke | 73/862.12 |
| 4,848,851 | 7/1989 | Kuraoka et al. | 364/426.01 |
| 4,864,173 | 9/1989 | Even | 310/105 |

Primary Examiner—Vinh Nguyen
Attorney, Agent, or Firm—Larson & Taylor

[57] ABSTRACT

A measuring device for measuring the braking torques generated by a vehicle-mounted electromagnetic retarder having a fixed secondary magnetic circuit or "stator". The device includes a sensor for measuring the speed of rotation V of the rotor of the retarder, a detector for detecting variations in the electrical potential difference U that is generated during operation of the retarder between two points on its stator, which points are sufficiently distinct from each other with respect to the way electrical potential varies at the two points during the operation, a further sensor for measuring the amplitude A of the variation, a memory circuit suitable for causing to correspond to each pair of measured values A and V the value C of the corresponding torque, and a unit for displaying or making use of the values C.

6 Claims, 1 Drawing Sheet

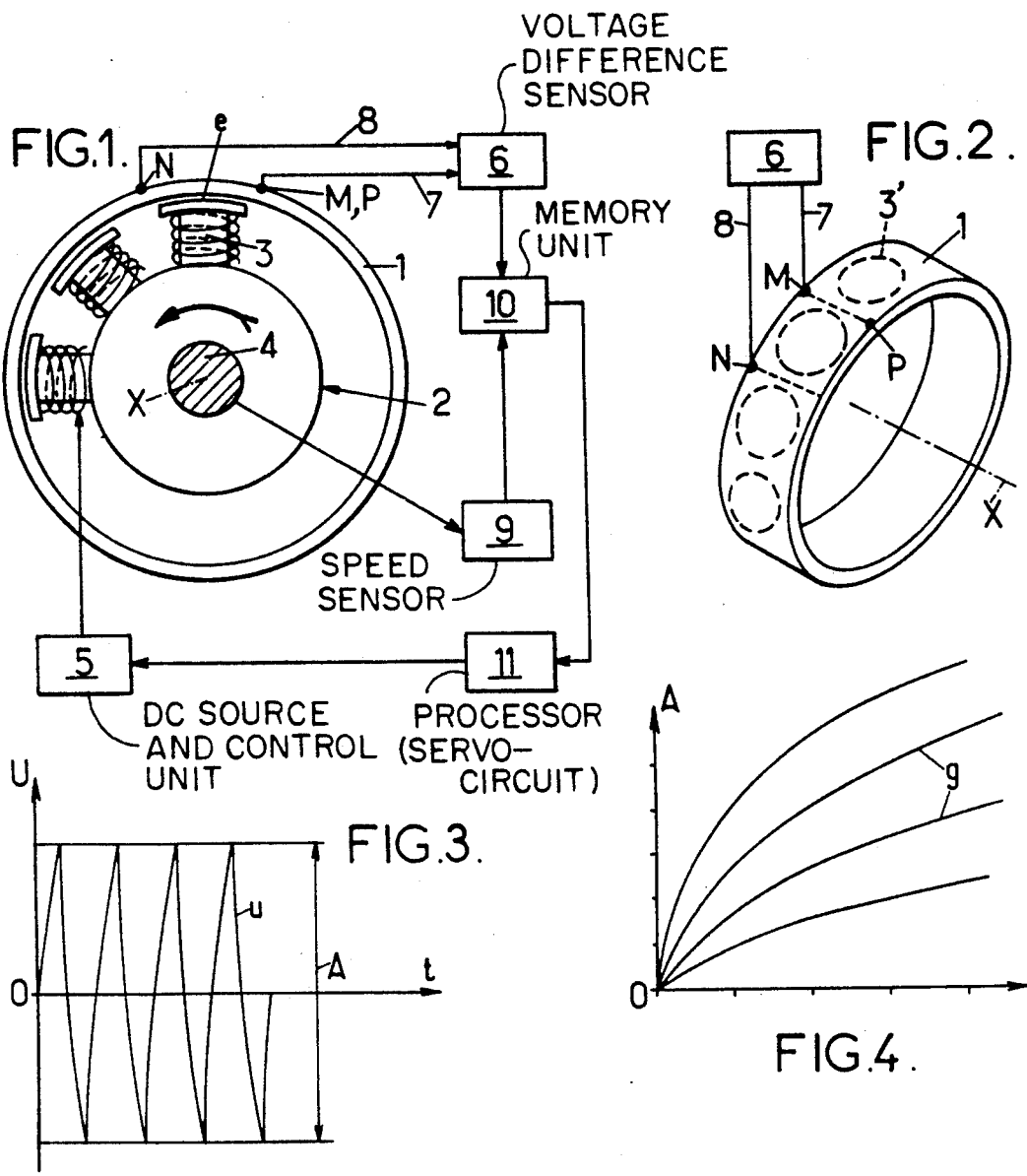
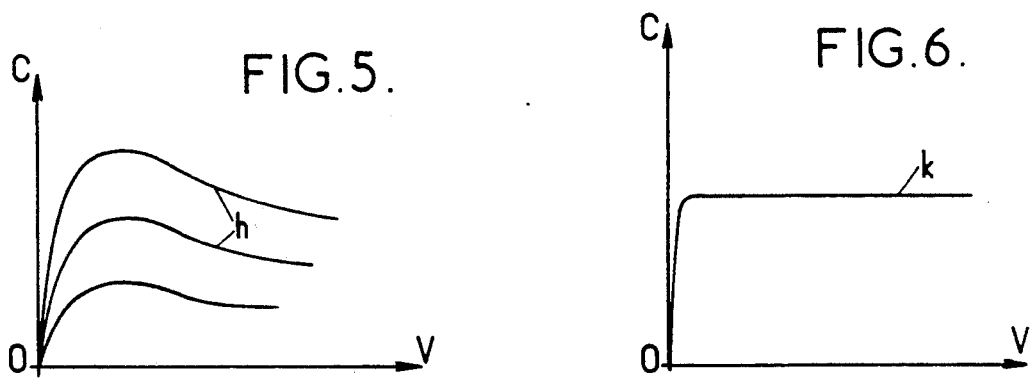

DEVICES FOR MEASURING BRAKING TORQUES GENERATED BY ELECTROMAGNETIC RETARDERS, AND DEVICES FOR ADJUSTING SUCH TORQUES

The invention relates to devices for measuring braking torques generated by vehicle-mounted electromagnetic retarders having fixed secondary magnetic circuits ("stators").

The invention also relates to devices for making use of such torque measurements, in particular for automatically adjusting the torques in question.

In the present specification, and unless explicitly specified otherwise, the term "rotor" should be understood to extend to a part not only that rotates, but also that has a primary magnetic circuit ("inducteur" in French), and similarly the term "stator" should be understood to extend to a part not only that does not rotate, but also that has a secondary magnetic circuit ("induit" in French).

BACKGROUND OF THE INVENTION

It is often useful to know the values of the braking torques generated by electromagnetic retarders when such retarders are put into operation.

For example, such knowledge may serve to detect breakdowns or loss of efficiency in the retarders under consideration.

Such knowledge also makes it possible to adjust the real value of the torque at each instant, for example so as to maintain the torque equal to a predetermined reference value which is independent of the speed of rotation of the retarder, with this being done by correcting the electrical feed voltage applied at each instant to at least one of the rotor coils of the retarder as a function of the difference between the said reference value and the real value of the torque as measured at that instant.

Hardly any proposals have yet been made for reliable and cheap devices that enable such torques to be measured in operation.

The present invention proposes such a device suitable for measuring the braking torque generated by an electromagnetic retarder mounted on a vehicle, with measurement being performed at each instant during real operation.

SUMMARY OF THE INVENTION

To this end, torque measuring devices of the present invention comprise means for measuring the speed of rotation V of the rotor of the retarder, means for detecting variations in the electrical potential difference U that is generated during operation of the retarder between two points on its stator, which points are sufficiently distinct from each other with respect to the way electrical potential varies at said points during said operation, means for measuring the amplitude A of said variation, a memory circuit suitable for causing to correspond to each pair of measured values A and V the value C of the corresponding torque, and means for displaying or making use of said values C.

In preferred embodiments, use is also made of one or more of the following dispositions:

- the points of the stator between which the potential difference U is measured are disposed on the same circle about the axis of the retarder and are angularly offset about said axis by an angle corresponding to the pole pitch of the rotor;
- the stator is at least partially in the form of a cylindrical drum that is circularly symmetrical, and the two points on said stator between which the potential difference U is measured are disposed in the same axial plane of said drum, and at opposite axial ends thereof;
- the stator is at least partially in the form of a circularly symmetrical disk, and the two points on said stator between which the potential difference U is measured are disposed in the same axial plane of said disk, at opposite radial ends thereof;
- the display means are visual display means located in the dashboard of the vehicle fitted with the retarder in question; and
- the means for making use of the torque values C as measured at each instant comprise a servo-control circuit to which a parameter is applied representing a reference torque value $C_0$, the servo-control circuit being organized to correct the electrical excitation voltage of at least one of the primary coils of the retarder as a function of the difference that exists at each instant between said reference value $C_0$ and the measured real value C of the torque generated at said instant by the retarder, the correction being in the direction that tends to cancel said difference.

In addition to the main dispositions mentioned above, the invention includes various other dispositions that are preferably used together therewith and which are described in greater detail below.

BRIEF DESCRIPTION OF THE DRAWING

Embodiments of the invention are described by way of example with reference to the accompanying drawing, in which:

FIG. 1 is a highly diagrammatic representation of an electromagnetic retarder fitted, in accordance with the invention both with a device for measuring the braking torques generated by the retarder and also with a device for adjusting said torques;

FIG. 2 is a diagrammatic perspective view of the stator of the above retarder, which view serves to locate the points between which potential differences are measured in accordance with the invention; and FIG. 3 to 6 are graphs for explaining the principles implemented by the invention.

DETAILED DESCRIPTION

In conventional manner, the electromagnetic retarder shown in FIGS. 1 and 2 comprises a rotor 2 that is coaxial with and inside a stator 1 that is constituted by a cylindrical drum of ferromagnetic material, which drum is circularly symmetrical about an axis X.

In this case, the rotor 2 comprises a ring of eight poles 3 that are uniformly spaced apart angularly and that are oriented radially, with each pole being separated from the stator by a cylindrical air gap e and being itself constituted by a magnetic core surrounded by a coil or winding of electric wire.

The rotor 2 is keyed angularly on a rotary shaft 4 that constitutes a portion of a vehicle transmission system.

The various coils are connected to a DC source via appropriate control and adjustment members, with said source and said members together being represented by block 5.

One such retarder is described, for example, in the present Applicants' U.S. Pat. No. 4,864,173.

Two points M and N (or M and P) on the stator 1 are selected that differ sufficiently to ensure that the variations in electrical potential that occur in each of these two points respectively during operation of the retarder are as distinct as possible from each other.

To this end, the two points in question M and N may be angularly offset about the axis X through an angle corresponding to the pole pitch of the rotor: in FIG. 2 dashed line curves 3' show locations that may be occupied by the various poles 3 of the rotor inside the stator at some given instant.

FIG. 2 also shows that the point M is advantageously disposed at an axial end of the drum 1 constituting the stator magnetic circuit.

In such a configuration, the point P that may be associated with the point M instead of the point N may be the point that lies in the same axial plane as the point M and at the same distance from the axis X, but at the axially opposite end of the stator 1.

Means are provided for continuously measuring the potential difference U that exists between the two points M and N or M and P.

To this end, the two points in question are connected to a potential difference measuring device 6 via conductors 7 and 8 that may be considered as being two electrodes that are applied to the points M and N or M and P on the drum 1 by spots of solder.

Experience shows that when the rotor 2 is electrically excited and is rotating, the potential difference U measured between the two points under consideration varies, alternating in time with the waveform as shown at u in FIG. 3. In FIG. 3, potential difference U is plotted up the Y-axis as a function of time t along the X-axis.

The resulting waves u are regular and have a recurrence frequency F that corresponds directly to the frequency at which the successive poles 3 go past each of the points M, N and/or P under consideration. The frequency F is proportional to the speed of rotation of the rotor 2 and to the number of poles 3 on the rotor.

The Applicants have observed that the amplitude A of the waves u measured from peak to peak is directly related to the torque C generated by the retarder in accordance with a well-determined law that can be represented by the curves g of the graph of FIG. 4, where each curve corresponds to a different speed of rotation V of the rotor 2, with the values of A increasing with increasing speed for each given value of the torque C.

The curves g may be established in a workshop prior to mounting the retarder in question on the vehicle to which it is attributed.

If the speed of rotation V of the rotor 2 and the above-defined amplitude value A are known at a given instant, then the said curves g can be used to determine the torque C being generated by the retarder at that instant.

To achieve this result, a device 9 is provided for measuring the speed V of the shaft 4 by any appropriate tachometer means (optionally on the basis of measuring the frequency F), and use is made of a memory and calculation circuit or unit 10 in which laws are recorded corresponding to the above curves g to produce a well-determined value for the torque C on the basis of any pair of parameters A and V.

The outputs from the two devices 6 and 9 that respectively provide the values of the parameters A and V (generally in the form of electrical voltages) are then applied to the circuit 10 and values for the torque C are taken from the output of the circuit 10.

These values may be displayed directly in visual form, e.g. by means of the pointer of an instrument having a scale (12) that is graduated directly in corresponding torque values and that is disposed on the dashboard of the vehicle containing the retarder in question.

In an advantageous variant, the values of the torque C generated in this way are used directly for the purpose of adjusting the torque.

This is shown diagrammatically in FIG. 1 where the information taken from the output of the circuit 10 is applied to a processor or servo control circuit 11.

The processing performed by said circuit 11 is advantageously as described below.

In general, with electromagnetic retarders, the curve representing variation in braking torque C as a function of the speed of rotation V of the shaft to be braked has the form shown in FIG. 5, with a peak for an average speed followed by an ever increasing drop as the speed increases. The various curves h shown in FIG. 5 correspond to different amounts of excitation applied to the retarder, with the torque generated thereby increasing with an increase in the number of its coils that are connected to the source of electricity.

In some cases, it may be desired to obtain a curve representative of variation in the torque C as a function of speed V that corresponds to the curve shown diagrammatically at k in FIG. 6, i.e. a curve having a horizontal rectilinear portion, or in other words it may be desired to obtain such a torque that is constant regardless of speed.

In particular, such a response is recommended by some manufacturers of friction braking equipment whenever it is desired to add an electromagnetic retarder to a given vehicle which is already fitted with friction brakes.

By knowing the instantaneous torque generated by the retarder as is made possible by the means described above, a servo-control system can be designed that ensures a constant torque in spite of changes in speed.

This can be done merely by giving the circuit 11 a reference (generally in the form of an electrical voltage) representing the value $C_0$ (as indicated by the arrow $C_0$ in FIG. 1) that is to be imposed on the braking torque, thus enabling said circuit at all times to generate a correcting term relating to the difference between the reference value $C_0$ and the real value C as measured at that instant and as delivered by the circuit 10. The correction or error signal generated in this way can then easily be used to correct the electrical excitation voltage generated by the equipment 5 in the appropriate direction tending to cancel said error signal.

In a variant, such regulation may be made use of to cause each position of the control handle for controlling excitation of the retarder to correspond systematically with constant predetermined percentages of the total torque that the retarder can generate.

For example, if the control handle can take up four active positions corresponding respectively to increasing amounts of retarder excitation by successively switching on two, then four, then six, and finally eight of the coils in the retarder, it is possible to organize the circuit 11 in such a manner as to cause each of these positions to correspond to torques whose values are respectively one-fourth, one-half, three-fourths, and all of the maximum torque that the retarder in question can generate.

The above measurements can also be used to remedy possible losses of retarder efficiency. Thus, supposing that the maximum available torque from the retarder is no more than 90% of the initial design torque, e.g. due to such a loss of efficiency, then the correction proposed above can still be used to maintain the absolute values of the torques that correspond respectively to 25%, 50%, and 75% of the maximum torque in the first three positions of the control handle.

As a result, and regardless of the embodiment used, a device is obtained for measuring the braking torques generated by electromagnetic retarders, and optionally devices are obtained for adjusting such torques, with the structure, the operation, and the advantages that result therefrom being sufficiently clear from the above. Naturally, and as can also be seen from the above, the invention is not limited to any of the applications and embodiments described more particularly; on the contrary, the invention covers any variant thereof.

I claim:

1. A measuring device for measuring the braking torques C generated by a vehicle-mounted electromagnetic retarder having a fixed secondary magnetic circuit or "stator", wherein the device comprises speed measuring means for measuring the speed of rotation V of the rotor of the retarder, detecting means for detecting variations in the electrical potential difference U that is generated during operation of the retarder between two points on said stator and for producing an output A corresponding to the amplitude of the detected variations in electrical potential difference, said points being sufficiently distinct from each other with respect to the way the electrical potential varies at said points during said operation, an electrical circuit, including a memory in which laws are stored which relate the amplitude A and the speed of rotation V to the braking torque C and a pair of inputs to which said speed measuring means and said detecting means are connected, for determining a value of the braking torque C for each pair of measured values of V and A and for producing an output in accordance therewith.

2. A measuring device according to claim 1, wherein the points of the stator between which the potential difference U is measured are disposed on the same circle about the axis of the retarder and are angularly offset about said axis by an angle corresponding to the pole pitch of the rotor.

3. A measuring device according to claim 1, in which the stator is at least partially in the form of a cylindrical drum that is circularly symmetrical, wherein the two points on said stator between which the potential difference U is measured are both disposed in the same axial plane of said drum, and at opposite axial ends thereof.

4. A measuring device according to claim 1, in which the stator is at least partially in the form of a circularly symmetrical disk, wherein the two points on said stator between which the potential difference U is measured are disposed in the same axial plane of said disk, at opposite radial ends thereof.

5. A measuring device according to claim 1, further comprising display means for displaying the braking torque C determined by said circuit, said display means comprising visual display means located in a dashboard of the vehicle fitted with the retarder in question.

6. A measuring device according to claim 1, further comprising a servocontrol circuit, which is connected to said electrical circuit and to which a parameter is applied representing a reference torque value $C_0$, for correcting the electrical excitation voltage of at least one of the primary coils of the retarder as a function of the difference that exists at each instant between said reference value $C_0$ and the value C of the torque generated at said instant by the retarder as determined by said electrical circuit based on the corresponding pair of measured values A and V, the correction being in the direction that tends to cancel said difference.

* * * * *